United States Patent Office 3,021,261
Patented Feb. 13, 1962

3,021,261
CULTURE PROCESS FOR GIBBERELLIC ACID
Donald E. Bergman, Waukegan, Frank W. Denison, Jr., North Chicago, and Waldo C. Friedland, Waukegan, Ill., assignors to Abbott Laboratories, North Chicago, Ill., a corporation of Illinois
No Drawing. Filed Aug. 14, 1959, Ser. No. 833,689
9 Claims. (Cl. 195—36)

The present invention relates to a method of producing gibberellic acid and more particularly to an improved medium for cultivating a culture from which gibberellic acid can be recovered.

Gibberellic acid is a plant growth promotant and is the subject of U.S. 2,842,051. Methods for producing gibberellic acid are illustrated in the foregoing patent and consist mainly in cultivating a culture of *Gibberella fujikuroi* in a medium containing a suitable carbon, nitrogen and mineral source.

There are many difficulties involved in the present methods of cultivating *Gibberella fujikuroi*. It is common for the known method to produce poor yields of gibberellic acid or if a relative good yield is realized the same good yield cannot be consistently reproduced. Other difficulties such as pigmentation of the culture and foaming of the medium make the production of gibberellic acid cumbersome and costly.

It is an object of this invention to provide a novel and improved process for producing gibberellic acid.

It is also an object of this invention to provide an improved culture from which gibberellic acid can be produced in consistently high yields and large quantities.

It has been found that yields which are consistently higher than those heretofore known can be produced by employing a carbon source for the Gibberella fermentation medium containing a combination of dextrin and sucrose. In order to obtain consistently higher yields, it has been discovered that the dextrin must be present in the medium in a range of about 4–12% w./v. while the sucrose must be present in a range of about 2–10% w./v. The preferred total amount of dextrin and sucrose being in the range of about 10–15% w./v.

The production of consistently high yeilds of gibberellic acid employing the predescribed amounts of dextrin and sucrose is apparently due to the fact that *Gibberella fujikuroi* being a long term fermentation culture requires a source of carbon which is not easily depleted. The use of dextrin in the fermentation medium supplies the medium with a source of carbon during the entire fermentation process; however, the use of dextrin alone is not feasible since the yields are low. By combining the foregoing described portions of dextrin and sucrose within the described ranges the medium is supplied with an optimum source of carbon thereby resulting in consistently high yields of gibberellic acid. It has also been found that by employing the foregoing ranges of dextrin and sucrose in the manner previously described that trace minerals are no longer needed in the medium as indicated in the above mentioned U.S. 2,842,051.

The present invention employs what are considered standard sources of nitrogen, phosphate, sulfate, magnesium and potassium. As for example, for a nitrogen source, ammonium nitrate is used; as a phosphate and potassium source, potassium hydrogen phosphate is used; and as a magnesium and sulfate source, magnesium sulfate is employed. The novel medium of the present invention can be used with any of the known suitable strains of *Gibberella fujikuroi* or with *Fusarium moniliforme*.

The following examples are set forth for the purpose of illustrating the present invention and should not be construed to limit the invention to the precise ingredients and proportions specified.

Example I

An aqueous fermentation culture medium is prepared containing the following ingredients:

| | G./l. |
|---|---|
| Potassium hydrogen phosphate | 3.0 |
| Magnesium sulfate | 3.0 |
| Ammonium nitrate | 3.5 |
| Octadecanol | 0.2 |

The culture medium having the foregoing composition and having a volume of approximately 12 liters is sterilized at a temperature of 250° F. for a period of ½ hour. Thereafter, the sterile solution medium is inoculated with 4% by volume of a 48 hour shaker flask culture of *Gibberella fujikuroi*, NRRL A–6781, and the inoculated medium fermented in a 30 liter fermenter at a temperature of 25° C., aerated at a rate of 4 liters per minute, with agitation at a rate of 360 r.p.m. for a period of 162 hours. Octadecanol is added to serve as a defoaming agent.

The following table illustrates the yields realized for 15 runs employing designated amounts of dextrin and sucrose as the source of carbon in the foregoing culture medium.

| Run No. | Carbon Source | Yield of Gibberellic acid, micrograms/ milliliter |
|---|---|---|
| 1 | 6% w./v. dextrin and 4% w./v. sucrose | 287 |
| 2 | do | 274 |
| 3 | do | 289 |
| 4 | do | 356 |
| 5 | do | 290 |
| 6 | do | 346 |
| 7 | do | 283 |
| 8 | do | 282 |
| 9 | do | 284 |
| 10 | do | 325 |
| 11 | do | 325 |
| 12 | do | 315 |
| 13 | 10% w./v. dextrin and 5% w /v. sucrose | 365 |
| 14 | 11% w./v. dextrin and 4% w./v. sucrose | 420 |
| 15 | do | 415 |

In the previous example the dextrin and sucrose are added together in the culture medium. The following example illustrates the results of runs employing a medium where the sucrose is added continually to the medium over a substantial period of time.

Example II

The same procedure is followed as described in Example I except that 5% dextrin is added alone to the medium initially and after a 3 day period the sucrose is added at a rate of 1% per day for 8 consecutive days.

The following table illustrates the yields for 4 runs employing the designated amounts of dextrin and sucrose and the source of carbon in the foregoing described manner.

| Run No. | Carbon Source | Yield of Gibberellic acid, micrograms/ milliliter |
|---|---|---|
| 1 | 5% w./v. dextrin and 8% w/.v. sucrose | 575 |
| 2 | do | 560 |
| 3 | do | 520 |
| 4 | do | 430 |

It will be noted that the yields indicated in the above table are greater on the average than those of Example I where dextrin and sucrose are added initially together.

Example III

An aqueous fermentation culture medium is prepared containing the following ingredients:

|  | G./l. |
|---|---|
| Potassium hydrogen phosphate | 3.0 |
| Magnesium sulfate | 3.0 |
| Ammonium nitrate | 3.5 |
| Octadecanol | 0.2 |

The culture medium having the foregoing composition and a volume of approximately 30 gallons is sterilized at a temperature of 250° F. for a period of ½ hour. Thereafter, the sterile culture medium is inoculated with 4% by volume of a 24 hour aerated bottle culture of *Gibberella fujikuroi*, NRRL A-6781, and the inoculated medium fermented in a 50 gallon fermenter at a temperature of 25° C., aerated at a rate of 1 volume per minute, with agitation at a rate of 350 r.p.m. for a period of 162 hours. The octadecanol is added to serve as a defoaming agent.

The table shown below represents the yields produced from 10 runs employing designated amounts of dextrin and sucrose as the source of carbon in the foregoing culture medium.

| Run No. | Carbon Source | Yield of Gibberellic acid, micrograms/milliliter |
|---|---|---|
| 1 | 6% w./v. dextrin and 4% w./v. sucrose | 283 |
| 2 | do | 284 |
| 3 | do | 244 |
| 4 | do | 282 |
| 5 | do | 250 |
| 6 | do | 308 |
| 7 | do | 430 |
| 8 | 10% w./v. dextrin and 5% w./v. sucrose | 370 |
| 9 | do | 345 |
| 10 | do | 280 |

Example IV

The same procedure is followed as described in Example III except that the culture *Fusarium moniliforme*, NRRL 2284 is substituted for *Gibberella fujikuroi*, NRRL A-6781, and the carbon source is 6% w./v. dextrin and 4% w./v. sucrose. The following table represents the yields of gibberellic acid produced from six runs made employing the predescribed culture medium and conditions.

| Run No. | Yield of Gibberellic Acid, micrograms/milliliter |
|---|---|
| 1 | 308 |
| 2 | 430 |
| 3 | 295 |
| 4 | 410 |
| 5 | 240 |
| 6 | 546 |

Example V

An aqueous fermentation culture medium is prepared containing the following ingredients:

|  | G./l. |
|---|---|
| Dextrin | 60.0 |
| Sucrose | 40.0 |
| Potassium hydrogen phosphate | 3.0 |
| Magnesium sulfate | 3.0 |
| Ammonium nitrate | 3.5 |
| Octadecanol | 0.2 |

The culture medium having the foregoing composition and a volume of approximately 5,000 to 6,300 gallons is sterilized at a temperature of 250° F. for a period of ½ hour. Thereafter, the sterile culture medium is inoculated with 5% by volume of a 24 hour seed culture of *Gibberella fujikuroi*, NRRL A-6781, and the inoculated medium fermented in a 10,000 gallon fermenter at a temperature of 26° C., aerated at a rate of .5 volume of air per minute, with agitation at a rate of 350 r.p.m. for a period of 162 hours. The octadecanol is added to serve as a defoaming agent. The yields of gibberellic acid obtained in six runs employing the predescribed culture medium and conditions in which the carbon source is 6% w./v. of dextrin and 4% w./v. of sucrose are represented in the following table.

| Run No. | Yield of Gibberellic Acid, micrograms/milliliter |
|---|---|
| 1 | 293 |
| 2 | 258 |
| 3 | 290 |
| 4 | 305 |
| 5 | 330 |
| 6 | 300 |

The foregoing examples illustrate that a culture medium for producing gibberellic acid employing a range of about 4–12% w./v. of dextrin and a range of about 2–10% w./v. of sucrose wherein the total amount of dextrin and sucrose being in the range of about 10–15% results in consistently high yields of gibberellic acid and is therefore a process which is desired commercially.

Others may readily adapt the invention for use under various conditions of service, employing one or more of the novel features disclosed or equivalents thereof. As at present advised with respect to the apparent scope of our invention, we desire to claim the following subject matter.

We claim:

1. A process for preparing consistently high yields of gibberellic acid comprising the cultivation of active strains of cultures selected from the class consisting of *Gibberella fujikuroi* and *Fusarium moniliforme* in an aerated nutrient solution characterized in that the source of carbon for said nutrient solution is dextrin and sucrose, said dextrin being present in said nutrient solution in a range of about 4–12% w./v. and said sucrose being present in a range of about 2–10% w./v., the total of said dextrin and sucrose being present in the range of about 10–15%.

2. The process of claim 1 wherein the sucrose is added continually to the medium over a substantial period of time.

3. A process for preparing consistently high yields of gibberellic acid comprising the cultivation of active strains of *Gibberella fujikuroi* in an aerated nutrient solution characterized in that the source of carbon for said nutrient solution is dextrin and sucrose, said dextrin being present in said nutrient solution in a range of about 4–12% w./v. and said sucrose being present in a range of about 2–10% w./v. the total of said dextrin and sucrose being present in the range of about 10–15%.

4. A process for preparing consistently high yields of gibberellic acid comprising the cultivation of active strains of cultures selected from the class consisting of *Gibberella fujikuroi* and *Fusarium moniliforme* in an aerated nutrient solution characterized in that the source of carbon for said nutrient solution is dextrin and sucrose, said dextrin being present in said nutrient solution in an amount of about 6% w./v. and said sucrose being present in an amount of about 4% w./v.

5. A process for preparing consistently high yields of gibberellic acid comprising the cultivation of active strains of cultures selected from the class consisting of *Gibberella fujikuroi* and *Fusarium moniliforme* in an aerated nutrient solution characterized in that the source of carbon for said nutrient solution is dextrin and sucrose, said dextrin being present in said nutrient solution in an amount of about 8% w./v. and said sucrose being present in an amount of about 2% w./v.

6. A process for preparing consistently high yields of gibberellic acid comprising the cultivation of active strains of *Gibberella fujikuroi* in an aerated nutrient solution characterized in that the source of carbon for said nutrient solution is dextrin and sucrose, said dextrin being present in said nutrient solution in an amount of about 8% w./v. and said sucrose being present in an amount of about 2% w./v.

7. A process for preparing consistently high yields of gibberellic acid comprising the cultivation of active strains of *Gibberella fujikuroi* in an aerated nutrient solution characterized in that the source of carbon for said nutrient solution is dextrin and sucrose, said dextrin being present in said nutrient solution in an amount of about 6% w./v. and said sucrose being present in an amount of about 4% w./v.

8. A process for preparing consistently high yields of gibberellic acid comprising cultivation of active strains of *Gibberella fujikuroi* in an aerated nutrient solution characterized in that the source of carbon for said nutrient solution is dextrin and sucrose, said dextrin being present in said nutrient solution in an amount of about 10% w./v. and said sucrose being present in an amount of about 5% w./v.

9. A process for preparing consistently high yields of gibberellic acid comprising the cultivation of active strains of *Gibberella fujikuroi* in an aerated nutrient solution characterized in that the source of carbon for said nutrient solution is dextrin and sucrose, said dextrin being initially present in said solution in an amount of about 5% w./v. and said sucrose being slowly added to said nutrient solution at the rate of 1% per day for an 8 day period.

References Cited in the file of this patent

UNITED STATES PATENTS

| | | |
|---|---|---|
| 2,842,051 | Brian et al. | July 8, 1958 |
| 2,865,812 | Borrow et al. | Dec. 12, 1958 |
| 2,906,671 | Borrow et al. | Sept. 29, 1959 |
| 2,906,673 | Borrow et al. | Sept. 29, 1959 |